INVENTORS
Ernest L. Corp
Robert C. Bates

ATTORNEYS

March 26, 1968 E. L. CORP ETAL 3,374,677
PRESSURE MEASURING DEVICE EMPLOYING A DIAPHRAGM-TYPE
PRESSURE RESPONSIVE UNIT
Filed Dec. 21, 1965 3 Sheets-Sheet 3

INVENTORS
Ernest L. Corp
Robert C. Bates

ATTORNEYS 3,374,677
PRESSURE MEASURING DEVICE EMPLOYING A DIAPHRAGM-TYPE PRESSURE RESPONSIVE UNIT
Ernest L. Corp and Robert C. Bates, Spokane, Wash., assignors to the United States of America as represented by the Secretary of the Interior
Filed Dec. 21, 1965, Ser. No. 515,486
8 Claims. (Cl. 73—406)

ABSTRACT OF THE DISCLOSURE

A pressure measuring device as described, having an outer diaphragm integrally united to its face plate, an inner diaphragm, a sealed fluid reservoir between diaphagms, and an air conveying tube outside the reservoir perpendicularly displaced with respect to the inner diaphragm. Pressure of the granular mass against the outer diaphragm indirectly urges the inner diaphragm into contact with the tube which closes a circuit. As increasing known amounts of air are injected into the tube, the air pressure reaches a magnitude which counteracts the granular mass pressure. This action moves the diaphragm out of contact with the tube and breaks the circuit.

---

The invention relates to a pressure measuring device.

In mining and construction work many times it becomes desirable to measure the earth and fill material pressure against rigid surfaces, such as mine supports, building foundations, retaining walls, rigid culverts, etc. In the building of storage facilities it is expedient to know the pressurses exerted by sand, gravel, cement, chemicals, grain, silage, etc., against the support members. Diaphragm-type pressure responsive units offer a convenient way to obtain a measurement of the pressure exerted by a mass of particulate material against a rigid surface. However, in order to accurately measure such stresses with the aid of a diaphragm-type pressure responsive unit, it is necessary that the inward deflection of the unit's sensitive face be less than one-thousandth the face diameter. This figure is the maximum permissible deflection, and any increase in the deflection will decrease the accuracy. If excessive inward deflection takes place, arching will occur in the particulate material over the unit's sensitive face, and an erroneous reading will result. There are several units presently in use which fulfill this deflection requirement, but their maximum pressure capability is 100 p.s.i.g. or less. However, many practical situations requiring the use of pressure responsive units involve pressure as high as 1000 p.s.i.g.

The object of this invention is to provide an accurate diaphragm-type pressure responsive unit capable of operating under pressures as high as 1000 p.s.i.g.

For a more detailed understanding of the invention and for further objects and advantages thereof, reference is to be had to the accompanying drawings in which.

Figure 1:
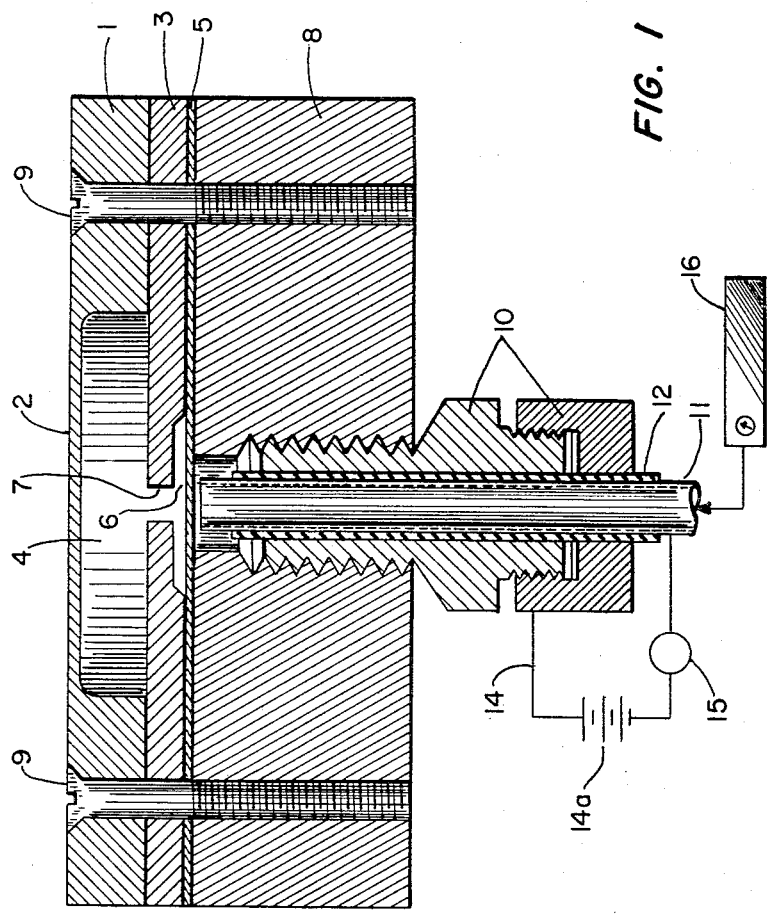
FIG. 1 shows a vertical cross section of the pressure responsive unit in combination with a schematically represented pressure indicating device.
Figure 2:
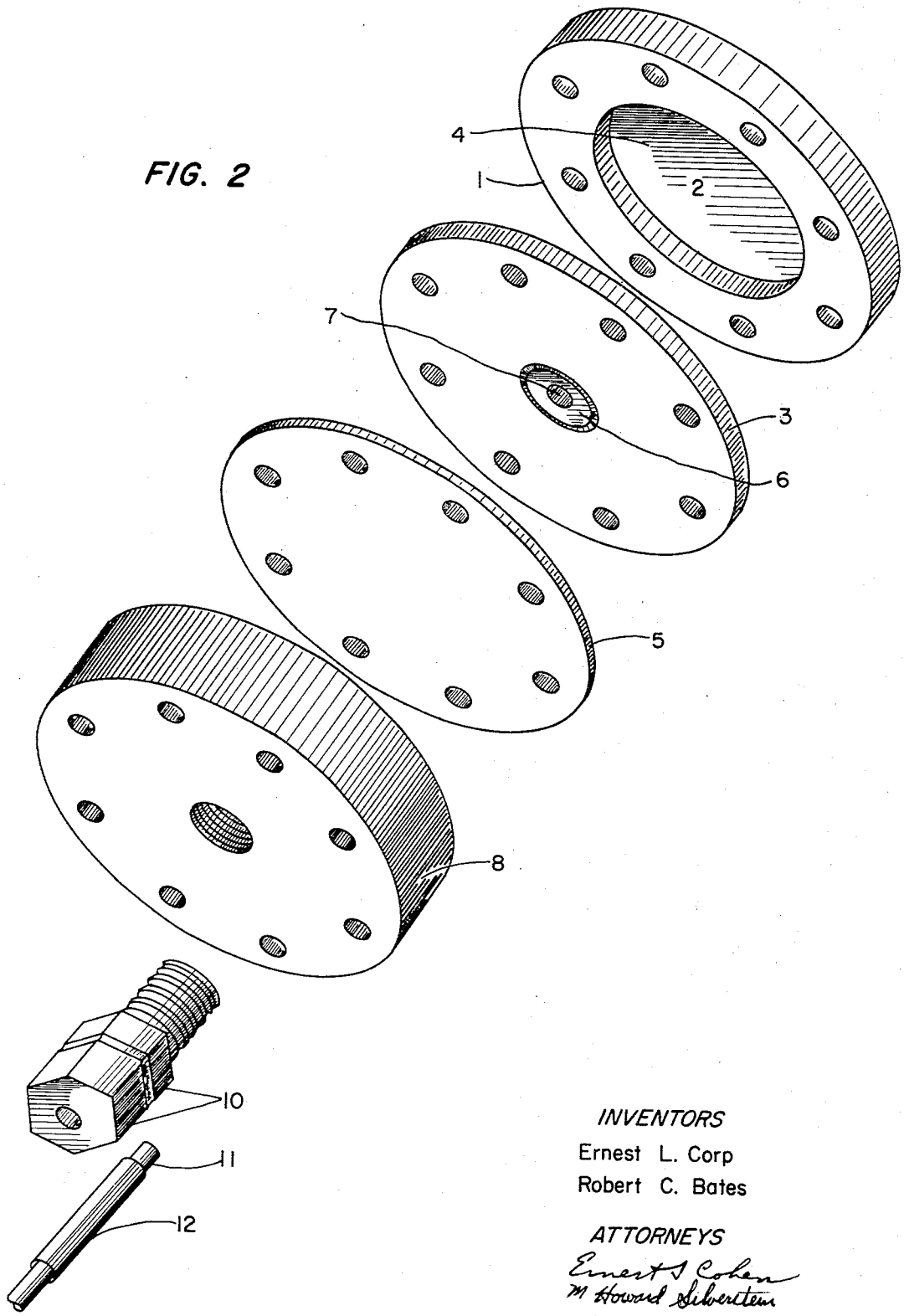
FIG. 2 shows an exploded view of the pressure responsive unit.

Referring to FIGS. 1 and 2, numeral 1 designates the face plate member of the pressure responsive unit which member contains outer pressure sensitive diaphragm 2, the diaphragm being completely integrated (i.e., no welding, etc.) with the main body of the face plate 1 by fabricating the plate as a singular unitary body (by way of molding, casting, etc.). A metal such as brass may be used. Immediately below face plate 1 is cover plate member 3 made of, for example, stainless steel. When face plate 1 is secured flush against cover plate 3, the cavity 4 in face plate 1 functions as a first fluid chamber. Pressure exerted by a mass of particulate material against the pressure sensitive diaphragm 2 is transmitted to the fluid in first fluid chamber. Immediately below cover plate 3 is the metallic inner diaphragm 5 composed of, for example, brass. When cover plate 3 is secured flush against the inner diaphragm 5, the recess 6 in cover plate 3 functions as a second fluid chamber. Fluid pressure within the first chamber is transmitted to the fluid in the second chamber by way of a connecting passage 7 in cover plate 3. In operation, plates 1 and 3 define the upper section of the pressure responsive unit which section contains two interconnected fluid chambers that form a fluid reservoir between the unit's inner and outer diaphragms. Immediately below diaphragm 5 is the lower section of the pressure responsive unit comprised of a base plate member 8. Face plate 1, cover plate 3, inner diaphragm 5 and base plate 8 are held together by, for example, bolts 9 and a commercial adhesive such as Loctite, a pipe sealant from the Loctite Corp. of Connecticut. A hollow metal screw mechanism 10, such as a hollow Swagelok made by the Crawford Ftting Company of Solon, Ohio, or a Tylok fitting made by Tylok International of Euclid, Ohio, is screwed into the base plate 8. Through the central hollow portion of screw mechanism 10 extends a metallic tube 11 made of, for example, stainless steel. Insulation 12 such as paint or tape electrically insulates tube 11 from the screw mechanism and, therefore, from the pressure responsive unit body.

Figure 3:
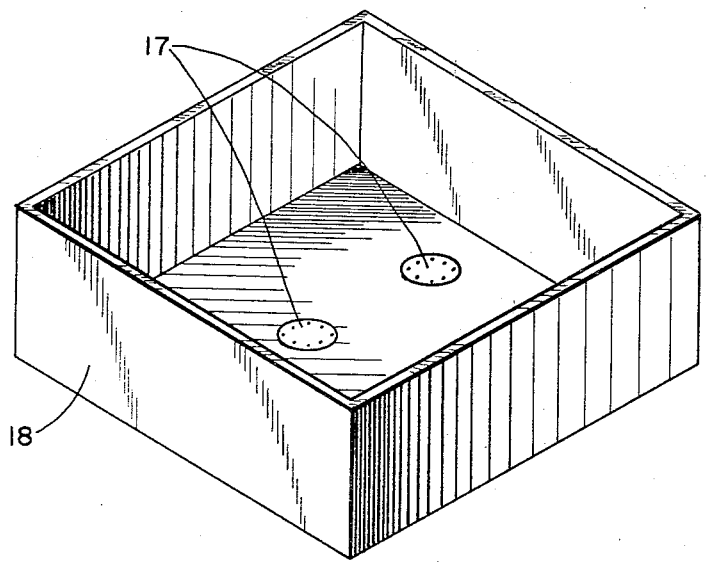
FIG. 3 shows two pressure responsive units flush-mounted in the bottom surface of a test storage container.

In the final assembled position of the unit, tube 11 is in light contact with the inner metallic diaphragm 5. The unit can then be flush mounted on a surface against which particulate material will bear. For example, as shown in FIG. 3, two units 17 are mounted on the inner bottom surface of a test storage container 18 made of, for example, concrete or steel. The container can then be filled with particulate material. As shown in FIG. 1, an electrical circuit is established across each unit by way of a wire 14, a power source such as a battery 14a, an open circuit-closed circuit indicator such as a light 15, tube 11, diaphragm 5, base plate 8 and screw mechanism 10. Particulate material pressure exerted against the outer diaphragm, which creates pressure against the inner diaphragm by way of the fluid in the two chambers in the upper section of the unit, maintains the indicator light in an illuminated state. By increasingly applying air pressure from air source 16 through the tube 11 against the underside of the diaphragm 5, the tube end will break contact with the inner diaphragm and light 15 will go out at a pressure which equals the pressure that the particulate material exerts indirectly against the inner diaphragm. A pressure indicating gage on the air supplying device 16 indicates the pressure being supplied by the device.

During assembly the components of the pressure responsive unit are immersed in a container of the pressure resopnsive fluid with the components in correct order for assembly. The face plate 1 is then bolted into position and the fluid entrapped in the first and second chambers formed from cavity 4 and recess 6, respectively. Water and glycerin have both been used satisfactorily but water offers less of a chance for air entrapment.

Zero adjustments of the assembled unit can be made either by changing the position of tube 11 in the hollow screw mechanism 10 or by threading the whole mechanism 10 in or out of the unit body.

The following dimensions of the pressure responsive unit are exemplary:

| Overall: | Inches |
|---|---|
| Diameter | 2.50 |
| Thickness | 0.589 |
| Faceplate 1: | |
| Thickness | 0.125 |
| Pressure sensitive diaphragm 2, diameter | 1.50 |
| Pressure sensitive diaphragm 2, thickness | 0.010 |
| Coverplate 3: | |
| Thickness | 0.062 |
| Central opening diameter | 0.063 |
| Thickness of plate at central opening | 0.04 |
| Diameter of circular recess portion 6 below central opening | 0.50 |
| Inner diaphragm 5: Thickness | 0.002 |
| Base 8: Thickness | 0.40 |
| Tube 11: Outer diameter | 1/8 |

A device constructed generally in accordance with the above dimensions is capable of operating under pressures as high as 1000 p.s.i.g. with a negligible hysteresis and a probable error of less than ± 2 p.s.i.g. Depending upon the desired application, the above dimensions, fabricating materials and sealing methods can obviously be varied.

Athough many construction factors are responsible for the capabilities of the unit, the following appear to significantly contribute to the unit's high pressure attributes: (1) the fabrication of the face plate 1 as a single unitary structure including the outer diaphragm whereby welding or otherwise attaching the outer diaphragm to the unit is avoided; (2) the employment of only a small fraction of the inner diaphragm 5 as a pressure sensing means, the remainder of the diaphragm being securely sandwiched between two sections of the pressure responsive unit, thereby avoiding soldering, welding or otherwise attaching the inner diaphragm to the unit; (3) the provision of a small recess 4 in the coverplate over the inner diaphragm 5 which prevents excessive upward deflection of the inner diaphragm.

Along withits high pressure capabilities, the device of the present invention provides a simple, inexpensive, pressure responsive unit. In addition, the short fluid passage between the two fluid chambers provides for quick action response. Furthermore, by utilizing part of the unit body in the electrical circuit, a simplified electrical system is established.

While the particular pressure responsive unit herein described is well adapted to carry out the objects of the present invention, it is to be understood that various modifications and changes may be made all coming within the scope of the following claims.

What is claimed is:

1. A pressure measuring device employing a pressure sensitive unit with an outer diaphragm which is directly responsive to pressures exerted by external particulate materials against said unit comprising:
   (a) a first section containing said outer diaphragm, and having a fluid reservoir therein; said outer diaphragm forming one of the walls of said reservoir;
   (b) an electrically conductive second section;
   (c) an electrically conductive inner pressure sensitive diaphragm sandwiched between said sections; a portion of said inner diaphragm forming another of the walls of said fluid reservoir in said first section;
   (d) pressure responsive fluid within said reservoir whereby pressure exerted by a particulate material external to said unit against said outer diaphragm is transmitted by said fluid to said inner diaphragm; and
   (e) means to determine the pressure created by said fluid against said inner diaphragm comprising
      (i) an electrically conductive tube holding means extending into said second section and adjustably secured thereto;
      (ii) an electrically conductive tube adjustably mounted within said tube holding means, one end of said tube being perpendicular to and in close proximity to that part of said inner diaphragm which forms a wall of said reservoir whereby said tube can be adjusted so as to touch said inner diaphragm;
      (iii) means to inject increasing amounts of air into another end of said tube, including means to determine the air pressure within said tube, whereby the air pressure within said tube can prevent said one end of said tube from touching said inner diaphragm;
      (iv) electrical insulation means between said tube and tube holding means;
      (v) wire means electrically connecting said tube to said tube holding means;
      (vi) a power source and an open circuit-closed circuit indicator on said wire means, whereby a closed circuit is established and indicated by said indicator when said one end of said tube in closed proximity to said inner diaphragm touches said inner diaphragm and whereby an open circuit is established and indicated by said indicator when said one end of said tube is out of contact with said inner diaphragm.

2. A pressure measuring device employing a pressure sensitive unit with an outer diaphragm which is directly responsive to pressures exerted by external particulate materials against said unit comprising:
   (a) a face member fabricated as a single unitary body which includes said outer diaphragm, said member having a cavity therein that extends from a cavity opening on one face thereof through said member terminating in close proximity to another face thereof thereby forming said outer diaphragm at said another face,
   (b) a cover member having first and second opposing surfaces thereon, said first surface having a recess thereon, said second surface being secured flush against said one face of said face member whereby said cover member portion opposite said cavity opening together with the walls of said cavity which include said outer diaphragm define a first fluid chamber;
   (c) an inner pressure sensitive diaphragm adjacent said first surface of said cover member; said first surface, except for that portion with said recess thereon, being secured flush against one face of said inner diaphragm; the walls of said recess and that portion of said inner diaphragm opposite said recess defining a second fluid chamber;
   (d) passage means in said cover member connecting said chambers;
   (e) pressure responsive fluid within said chambers whereby pressure exerted by a particulate material external to said device against said outer diaphragm is transmitted by said fluid to said inner diaphragm;
   (f) a base member adjacent the other face of said inner diaphragm, said base member being secured flush against said inner diaphragm except for that portion of said inner diaphragm which forms a wall of said second fluid chamber; and
   (g) means to determine the pressure exerted by said pressure responsive fluid against said inner diaphragm during operation of said pressure responsive unit, a portion of said pressure determination means extending through said base member and being in close proximity to that portion of said inner diaphragm which forms a wall of said second fluid chamber.

3. The device of claim 2 wherein said inner diaphragm and said base member are electrically conductive, wherein a passage extends through said base member, one end of said passage being immediately adjacent said inner diaphragm at that portion of said inner diaphragm which forms a wall of said second chamber, and wherein said pressure determination means comprises:
  (a) an electrically conductive tube holding means extending into said passage and adjustaby secured thereto;
  (b) an electrically conductive tube adjustably mounted within said tube holding means, one end of said tube being perpendicular to and in close proximity to that part of said inner diaphragm which forms a wall of said second chamber whereby said tube may be adjusted so as to touch said inner diaphragm;
  (c) means to inject increasing amounts of air into another end of said tube, including means to determine the air pressure within said tube, whereby the air pressure within said tube may prevent said one end of said tube from touching said inner diaphragm;
  (d) electrical insulation means between said tube and said tube holding means;
  (e) wire means electrically connecting said tube to said tube holding means;
  (f) a power source and an open circuit-closed circuit indicator on said wire means, whereby a closed circuit is established and indicated by said indicator when said one end of said tube in close proximity to said inner diaphragm touches said inner diaphragm and whereby an open circuit is established and indicated by said indicator when said one end of said tube is out of contact with said inner diaphragm.

4. The device of claim 2 wherein said face member, cover member and base member are each plate shaped.

5. A pressure measuring device employing a pressure sensitive unit with an outer diaphragm which is directly responsive to pressures exerted by external particulate materials against said unit comprising:
  (a) a first section containing said outer diaphragm as an integral part thereof, and having a fluid reservoir therein; said outer diaphragm forming one of the walls of said reservoir;
  (b) a second section;
  (c) an inner pressure sensitive diaphragm sandwiched between said sections; about $1/25$ of the area of said inner diaphragm forming another of the walls of said fluid reservoir in said first section;
  (d) pressure responsive fluid within said reservoir whereby pressure exerted by particulate materials external to said unit against said outer diaphragm is transmitted by said fluid to said inner diaphragm; and
  (e) means to determine the pressure exerted by said fluid against said inner diaphragm during operation of said unit, a portion of said pressure determination means extending into said second section of said unit and being in close proximity to that portion of said inner diaphragm which forms a wall of said reservoir.

6. The device of claim 5 wherein said reservoir comprises
  (a) a first fluid chamber, said outer diaphragm forming one of the walls of said chamber;
  (b) a second fluid chamber, said about $1/25$ of the area of said inner diaphragm forming one of the walls of said second chamber; and
  (c) passage means connecting said two chambers.

7. The device of claim 6 wherein the length of said passage means is shorter than the shortest dimension of said first fluid chamber.

8. A pressure measuring device employing a pressure sensitive unit with an outer diaphragm which is directly responsive to pressures exerted by external particulate materials against said unit comprising:
  (a) a first circular plate-shaped section containing said outer diaphragm as an integral part thereof, and having a fluid reservoir substantially concentrically disposed therein; said outer diaphragm forming one of the walls of said reservoir;
  (b) a second circular plate-shaped section;
  (c) a circular inner pressure sensitive diaphragm sandwiched between said sections; an area along about $1/5$ of the diameter of said inner diaphragm forming another of the walls of said fluid reservoir in said first section;
  (d) pressure responsive fluid within said reservoir whereby pressure exerted by particulate materials external to said unit against said outer diaphragm is transmitted by said fluid to said inner diaphragm; and
  (e) means to determine the pressure exerted by said fluid against said inner diaphragm during operation of said unit, a portion of said pressure determination means extending into said second section of said unit and being in close proximity to that portion of said inner diaphragm which forms a wall of said reservoir.

References Cited

UNITED STATES PATENTS 2,297,679  10/1942  Allen _____ 73—408
2,437,440   3/1948  Rigden _____ 73—406

DAVID SCHONBERG, *Primary Examiner.*

LOUIS R. PRINCE, *Examiner.*

DENIS E. CORR, *Assistant Examiner.*